UNITED STATES PATENT OFFICE.

JAMES ANTHONY GRAHAM, OF LONDON, COUNTY OF MIDDLESEX, ENGLAND.

METHOD OF TREATING CERTAIN VEGETABLE FIBROUS SUBSTANCES FOR THE PRODUCTION OF FIBER FOR SPINNING, PAPER-MAKING, &c.

SPECIFICATION forming part of Letters Patent No. 280,171, dated June 26, 1883.

Application filed January 16, 1883. (No specimens.) Patented in England November 10, 1882, No. 5,365.

*To all whom it may concern:*

Be it known that I, JAMES ANTHONY GRAHAM, a subject of the Queen of Great Britain, residing in the city of London, in the county of Middlesex, in the United Kingdom of Great Britain, have invented certain new and useful Improvements in the Method of Treating Certain Vegetable Fibrous Substances for the Production of Fibers for Spinning, Paper-Making, and other Purposes, (for which I have obtained a patent in Great Britain, No. 5,365, bearing date November 10, 1882;) and I do hereby declare that the following is a full, clear, and exact description of the invention.

My invention relates to the method of treating such vegetable fibrous substances as are capable of producing fibers suitable for spinning, paper-making, and other purposes when boiled or steeped in a solution of sulphurous acid, or a sulphite or bisulphite of soda, potash, magnesia, lime, or other suitable base and water, preferably in a closed vessel or boiler suitably protected from the action of the chemicals used, and fitted with a valve which can be opened, so as to allow the gases and volatile hydrocarbons contained naturally within and around the fibers (either in chemical combination or mechanical adhesion therewith) to escape.

I will now proceed to explain the manner of carrying out my said invention in a closed vessel or boiler.

In carrying out the process above described there is a constant loss of sulphurous-acid gas going on, and consequently a continual weakening of the solution employed, in order to avoid which I prefer to employ the monosulphite of potash, soda, magnesia, lime, or other suitable base and water. Either of these substances, or a suitable combination of them, and water are placed in the boiler with the fibrous substances to be treated, and the temperature raised to or above boiling-point, and after the hydrocarbons, air, and gases natural to the fibrous substances have been driven out by the heat and allowed to escape I pump or inject into the vessel or boiler sulphurous acid, either in its gaseous or liquid state or in combination with potash, soda, magnesia, lime, or other suitable base and water, or a solution of sulphurous acid, thus forming in the closed vessel or boiler a solution containing an excess of sulphurous acid above that required to form, in combination with the base, a monosulphite. The operation of injecting sulphurous acid or its combinations with potash, soda, magnesia, lime, or other suitable base, as above described, may be repeated from time to time during the boiling, so as to fully maintain, and, if necessary, increase, the strength and efficiency of the chemical solution employed.

According to this mode of treatment a saving of the chemical employed is effected, little or no sulphurous-acid gas being lost during the time the gaseous hydrocarbons, air, and other gaseous or volatile matters are being driven out of the fibrous materials.

It will be readily understood that in the case where I employ an open vessel or boiler the operation will naturally be carried on at the temperature of the boiling-point of the solution employed; but the mode of keeping such solution at a fairly uniform strength, or, if necessary, increasing the strength of the same, will be substantially the same as that above described when using a closed vessel or boiler, in which latter case the operation may be carried on either at or above the boiling-point of the solution. When using an open boiler, it is evident that the excess of sulphurous acid supplied during the boiling will be constantly given off in a gaseous state from the surface of the liquid, and must consequently be replaced by further injections, while the acid given off can be led away and condensed, so as to enable it to be again used, if desired. In cases where the vegetable substances are boiled with water alone, or in conjunction with potash, soda, magnesia, lime, or other suitable base in the form of an oxide or an acid sulphite, the injection of sulphurous acid or its combinations with potash, soda, magnesia, lime, or other suitable base during the boiling will be equally beneficial. I prefer to inject the sulphurous acid, or the combinations of the same, as above described, into the vessel or boiler at the bottom, and to cause it to come in contact with the solution therein before reaching the fibrous material, for which purpose I form a kind of chamber beneath the boiler, and separated therefrom by a perforated disk or diaphragm of lead or other suitable material capable of resisting the action of the solution, so as to allow the latter to fill the chamber. To this chamber a pipe is connected, through which the sulphurous acid, or a combination of the same with a suitable base, as described, is forced or injected by any suitable apparatus.

It will be necessary to coat the interior of the vessel or boiler and the parts with which the sulphurous acid or its combinations described come in contact with lead or other suitable metal or material capable of resisting the action of the same.

Having now described the nature of my invention and the manner of carrying the same into effect, what I desire to claim and secure by Letters Patent is—

1. The treatment of vegetable substances capable of producing fibers suitable for spinning, paper-making, and other purposes, either in a closed or open vessel or boiler, first with the monosulphite of potash, soda, magnesia, lime, or other suitable base and water, and, when the gases contained in the vegetable substances have been driven off, injecting into the vessel or boiler sulphurous acid in the gaseous or liquid state, either alone or in combination with potash, soda, magnesia, lime, or other suitable base, or a solution of sulphurous acid, so as to form in the boiler a solution containing an excess of sulphurous acid above that required to form in combination with the base a monosulphite, all substantially as herein described.

2. The injection of sulphurous acid, either alone or in combination with potash, soda, magnesia, lime, or other suitable base in the form of a solution containing an excess of acid, into a closed or open vessel or boiler during the operation of boiling vegetable substances, in order to produce fibers suitable for spinning, paper-making, and other purposes, by treating them with water alone or in conjunction with potash, soda, magnesia, lime, or other suitable base in the form of an oxide or a monosulphite, or an acid sulphite thereof, all substantially as herein described.

JAMES ANTHONY GRAHAM.

Witnesses:
HERBERT JOHN ALLISON,
JOHN DEAN.